(12) United States Patent
Kulik

(10) Patent No.: US 8,694,051 B2
(45) Date of Patent: Apr. 8, 2014

(54) ORIENTATION SENSOR CALIBRATION

(75) Inventor: Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 12/775,935

(22) Filed: May 7, 2010

(65) Prior Publication Data

US 2011/0275408 A1    Nov. 10, 2011

(51) Int. Cl.
*H04M 1/00* (2006.01)
*G01D 18/00* (2006.01)
*G01C 17/38* (2006.01)

(52) U.S. Cl.
USPC ............ 455/556.1; 702/85; 702/92; 702/104; 73/1.01; 73/1.76; 73/1.77

(58) Field of Classification Search
USPC ............. 702/85, 92, 104; 73/1.01, 1.76, 1.77; 455/556.1
See application file for complete search history.

(56) References Cited

U.S. PATENT DOCUMENTS

| 2007/0117078 | A1 | 5/2007 | Bruns et al. | |
| 2009/0044418 | A1 | 2/2009 | Chen | |
| 2009/0244700 | A1* | 10/2009 | Meyers et al. | 359/430 |
| 2009/0326816 | A1* | 12/2009 | Park et al. | 701/213 |
| 2010/0283840 | A1 | 11/2010 | Belenkii et al. | |

FOREIGN PATENT DOCUMENTS

| CN | 101241010 A | 8/2008 |
| NL | 1037021 C | 12/2010 |

OTHER PUBLICATIONS

International Search Report and Written Opinion—PCT/US2011/035620, ISA/EPO—Sep. 7, 2011.
Liang Wang, Hehua Ju: "Visual Sun Compass", 9th Asian Conference on Computer Vision, Workshop 1: Community Based 3D Content and Its Applications in Mobile Internet Environments, Sep. 23, 2009, Sep. 27, 2009, XP002652144.

* cited by examiner

*Primary Examiner* — Kamran Afshar
*Assistant Examiner* — Omoniyi Obayanju
(74) *Attorney, Agent, or Firm* — Michael Johnson

(57) ABSTRACT

A mobile device configured to be used in a wireless communication network includes: an image capture device; at least one sensor configured to measure a first orientation of the mobile device; and a processor communicatively coupled to the image capture device and the at least one sensor and configured to: identify an object in an image captured by the image capture device; use a position of the mobile device to determine an actual location of the object relative to the mobile device; and use the actual location of the object relative to the mobile device and the image to determine a correction for the sensor.

33 Claims, 5 Drawing Sheets

ORIENTATION SENSOR CALIBRATION

BACKGROUND

As inexpensive and small orientation sensors, like compasses, accelerometers, and gyroscopes, are widely available, they are being incorporated into many modern mobile devices, like cell phones, GPS receivers and others. The sensors are used to determine device orientation for portrait/landscape display switching, gesture recognition, map alignment in North direction, "point and click" object recognition, pedometry, navigation, etc.

While good orientation accuracy is important for most applications, achieving high accuracy with the low cost sensors is challenging. This is where sensor calibration often helps. The calibration process constitutes measuring and storing sensor parameters, like offset and scale factor. The calibrated parameters are then used in normal operation to accurately convert "raw" sensor readings into mobile device orientation.

Some mobile devices are being calibrated in factory in special fixtures, others by the user by placing the device in the specified orientations, while other devices undergo continuous or occasional automatic "on the fly" calibration during normal operation. Even if the device has been calibrated in factory, additional calibration, user or automatic, is useful and sometimes even unavoidable. For example, when a device featuring a magnetic compass is placed in a vehicle, magnetic fields induced by ferrous metal parts should be calibrated out to improve compass accuracy.

SUMMARY

An example of a mobile device configured to be used in a wireless communication network includes: an image capture device; at least one sensor configured to measure a first orientation of the mobile device; and a processor communicatively coupled to the image capture device and the at least one sensor and configured to: identify an object in an image captured by the image capture device; use a position of the mobile device to determine an actual location of the object relative to the mobile device; and use the actual location of the object relative to the mobile device and the image to determine a correction for the sensor.

Implementations of such a mobile device may include one or more of the following features. The object is a celestial object and the processor is configured to use the position of the mobile device and a current time to determine the actual location of the celestial object relative to the mobile device. To determine the correction, the processor is configured to determine at least one of (1) an estimated location of the object relative to the mobile device using the image and the first orientation of the mobile device, or (2) a second orientation of the mobile device using the image and the actual location of the object. To determine the correction, the processor is configured to: determine the estimated location of the object; compare the actual location and the estimated location to determine a location difference; and determine the correction such that the location difference will be reduced. To determine the correction, the processor is configured to: determine the second orientation of the mobile device; and determine the correction such that a difference between the first orientation and the second orientation will be reduced. The processor is configured to determine the first orientation and determine the correction for each of a plurality of images captured by the image capture device. The processor is configured to determine the first orientation for each of a plurality of images captured by the image capture device and to determine a turn rate of the mobile device based on the first orientation for the plurality of images to provide a virtual gyroscope for the mobile device. The image capture device is configured to capture images automatically, without user input. The processor is configured to provide a virtual compass for the mobile device using the first orientation, the correction, the image, and the actual location of the object.

An example of a method in a mobile device of calibrating the mobile device includes: capturing, with an image capture device of the mobile device, an image of an object; determining a first orientation of the mobile device using a sensor of the mobile device; determining an actual location of the object relative to the mobile device using a position of the mobile device and a current time; and determining a correction for the sensor, the correction being determined using the actual location of the object relative to the mobile device, the image, and the first orientation.

Implementations of such a method may include one or more of the following features. The object is a celestial object and determining the actual location of the object relative to the mobile device comprises using the position of the mobile device and a current time. Determining the correction includes determining at least one of (1) an estimated location of the object relative to the mobile device using the image and the first orientation of the mobile device, or (2) a second orientation of the mobile device using the image and the actual location of the object. The method further includes repeating the capturing, determining the first orientation, and determining the correction. Repeating the capturing is done at least one of (1) for different objects, or (2) at different device orientations. The capturing occurs automatically, without user input.

An example of a computer program product residing on a processor-readable medium, of a mobile telecommunications device, includes processor-readable instructions configured to cause a processor to: determine a first orientation of the mobile device using a sensor of the mobile device; determine an actual location of the celestial body relative to the mobile device using a position of the mobile device and a current time; and use the actual location of the celestial body relative to the mobile device and an image, taken by the mobile device, of a celestial body to determine a correction for the sensor.

Implementations of such a computer program product may include one or more of the following features. The object is a celestial object and the instructions configured to cause the processor to determine the actual location of the celestial object relative to the mobile device are configured to cause the processor to use the position of the mobile device and a current time. The instructions configured to cause the processor to determine the correction are configured to cause the processor to determine at least one of (1) an estimated location of the object relative to the mobile device using the image and the first orientation of the mobile device, or (2) a second orientation of the mobile device using the image and the actual location of the object. The instructions configured to cause the processor to determine the correction are configured to cause the processor to: determine the estimated location of the object; compare the actual location and the estimated location to determine a location difference; and determine the correction such that the location difference will be reduced. The instructions configured to cause the processor to determine the correction are configured to cause the processor to: determine the second orientation of the mobile device; and determine the correction such that a difference between the first orientation and the second orientation will be reduced. The instructions configured to cause the processor to determine the correction are configured to cause the processor to determine the correction for each of a plurality of images captured by the image capture device. The instructions configured to cause the processor to determine the first orientation are configured to cause the processor to determine the first orientation for each of a plurality of images captured by the image capture device, the instructions further including instructions configured to cause the processor to determine a turn rate of the mobile device based on the first orientation for the plurality of images to provide a virtual gyroscope for the mobile device.

Another example of a mobile device configured to be used in a wireless communication network includes: an image capture device; first orientation means for measuring a first orientation of the mobile device; and correction means, communicatively coupled to the image capture device and the first orientation means, for: identifying a celestial body in an image captured by the image capture device; using a position of the mobile device and a current time to determine an actual location of the celestial body relative to the mobile device; and using the actual location of the celestial body relative to the mobile device and the image to determine a correction for the sensor.

Implementations of such a mobile device may include one or more of the following features. The correction means is configured to use the position of the mobile device and a current time to determine the actual location of the celestial body relative to the mobile device. The correction means are configured to: determine the estimated location of the celestial body; compare the actual location and the estimated location to determine a location difference; and determine the correction such that the location difference will be reduced. The correction means are configured to: determine the second orientation of the mobile device; and determine the correction such that a difference between the first orientation and the second orientation will be reduced. The correction means are configured to determine the first orientation and determine the correction for each of a plurality of images captured by the image capture device. The correction means are configured to determine the first orientation for each of a plurality of images captured by the image capture device and to determine a turn rate of the mobile device based on the first orientation for the plurality of images to provide a virtual gyroscope for the mobile device. The image capture device is configured to capture images automatically, without user input. The correction means are configured to provide a virtual compass for the mobile device using the first orientation, the correction, the image, and the actual location of the celestial body.

Items and/or techniques described herein may provide one or more of the following capabilities. Orientation measurements and indications of devices may be improved. Accurate compass readings can be provided in the presence of strong magnetic fields and/or in the presence of ferrous materials. While item/technique-effect pairs have been described, it may be possible for a noted effect to be achieved by means other than those noted, and a noted item/technique may not necessarily yield the noted effect.

BRIEF DESCRIPTION OF THE DRAWINGS

In the drawings, like elements bear like reference numerals.

DETAILED DESCRIPTION

Figure 1:
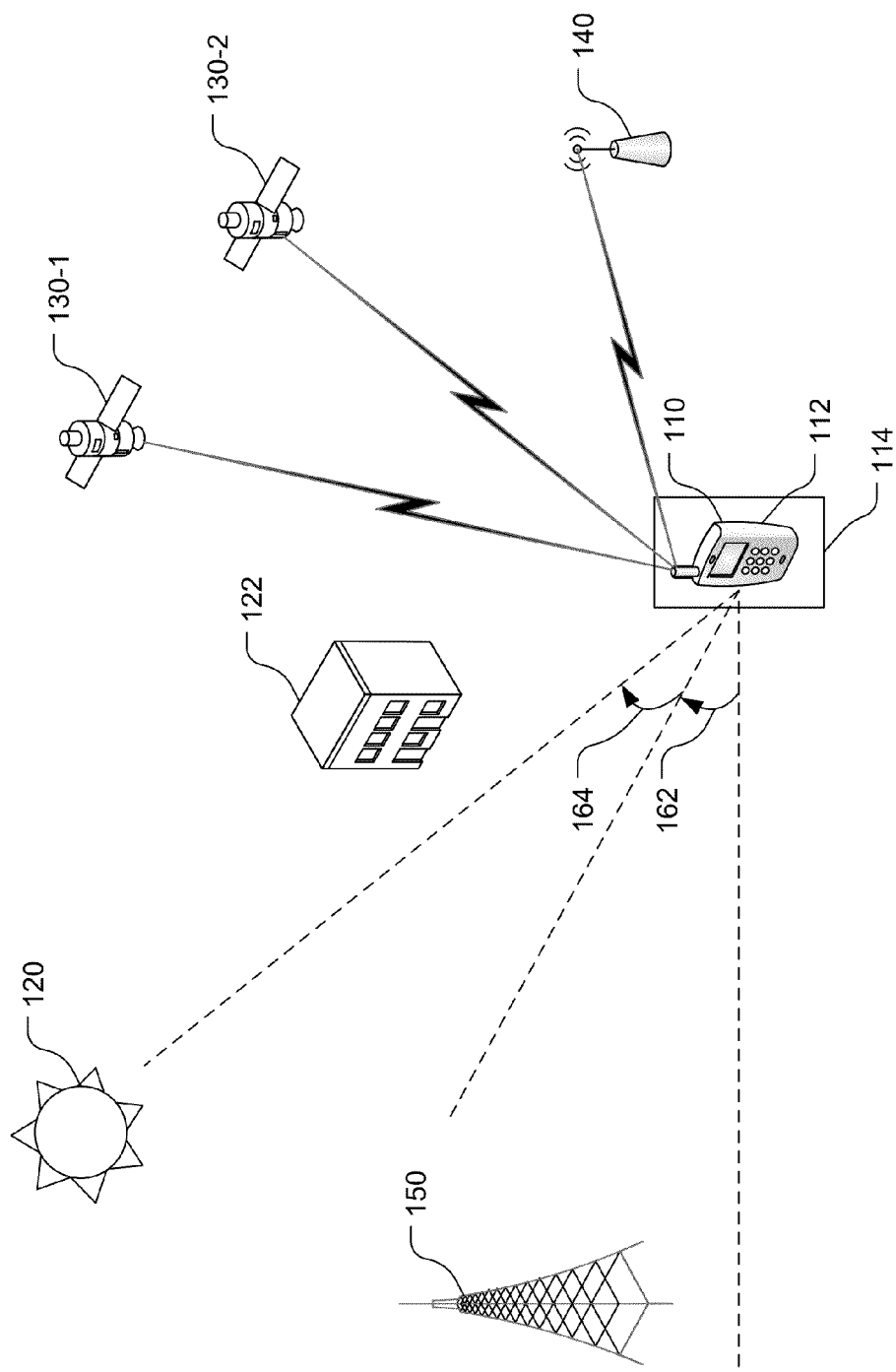
FIG. 1 is a simplified diagram of a mobile device in an environment exposed to relatively stationary objects including celestial objects.

One or more orientation sensors in a mobile device may be recalibrated or corrected using information that is available or accessible to the mobile device. For example, the position of objects can be used to calibrate one or more orientation sensors. The objects are preferably relatively stationary and of known location. The objects, however, may be used even if their actual locations are not known, e.g., being used to determine motion of a mobile device such as a mobile phone. An example of a relatively stationary object of known location is a celestial object such as the sun or the moon. While the description below focuses on the use of celestial objects, other objects may be used, such as buildings, portions of buildings (e.g., windows, doors), landmarks (e.g., mountains), etc.

Navigators can sight to one or more celestial objects and determine a course of direction by referencing maps, almanacs, or other tables. A position aware mobile device can use knowledge of its position in combination with reference maps, almanacs or tables to determine the position of celestial objects. The orientation sensors of the mobile device can be calibrated or otherwise corrected based on this information.

A celestial object may be any object for which an almanac may be generated. Although the term "celestial object" typically refers to natural objects, such as the sun, moon, or stars, a man-made object may also be considered a celestial object, provided an almanac of its position may be determined.

An image capture device, such as a camera, can be used for the celestial object calibration of the mobile device orientation sensors and for compass emulation. A method of determining the direction and calibrating the orientation sensors can be based on determining angular measurements of a relatively stationary object such as a celestial body, such as the sun, moon, planets or stars located in the sky.

The mobile device can be pointed to the identified celestial object and the orientation sensor readings, e.g. azimuth and elevation, may be determined while the mobile device is pointed at the celestial object. For example, an image of the celestial object can be captured by the mobile device, and the values of the orientation sensors can be determined at the time of image capture. When the device location and time are also known, the "true" or actual azimuth and elevation of the celestial object relative to the mobile device can be calculated as well, based on an almanac of the celestial object. The almanac of the celestial object provides, given the current time, the true or actual location of the object, e.g., relative to the earth, from which the true or actual azimuth and elevation relative to the mobile device can be derived based on the location of the mobile device. Device location and time uncertainties are preferably small enough that error in the calculated azimuth and elevation translate into less than one pixel of the image capture device for the location of celestial object in the captured image. The differences between the "true" and the measured parameters are determined and saved. The differences or a correction based on one or more differences can be applied to the orientation sensor measurements as corrections.

Different embodiments of celestial-object-based calibration can be implemented in a variety of applications, e.g, from the compass calibration on ships and aircraft to the inertial navigation system calibration on the ballistic missiles and space rockets. The actual implementation can depend on the level of accuracy desired of the calibration as well as the level of accuracy obtainable from the measurement sensors.

In lower-end applications, the optical axis (or other reference axis) of the device may be manually pointed to the celestial object before the calibration. High-end systems can be configured to perform substantially the entire calibration process automatically, with specialized optical-mechanical sensors finding and tracking the celestial object and performing angular measurements.

Once calibrated, the orientation sensors can be used in combination with the image capture device for a variety of applications. For example, the image capture device in combination with an accelerometer and image stabilization gyroscopes can be used to emulate a compass. Further, in situations where the position of the mobile device is unknown, the image capture device can be used in combination with the celestial object almanac to estimate the location of the mobile device. The position estimate obtained from the celestial object may be used directly or may be used in combination with other position location techniques. For example, the position location determined from the image capture and celestial object almanac may be used as an initial position estimate of an iterative position location technique. Alternatively, the initial position estimate can be used to determine acquisition assistance information for a GNSS positioning.

Embodiments described herein relate to using an image capture device, such as a photo camera, for the calibration of mobile device sensors. The mobile device may already incorporate the photo camera, and in addition to using the photo camera for capturing pictures, the device uses its photo sensor to calibrate accelerometer, compass, and gyro sensors in the mobile device.

As used herein, a mobile device refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network.

Referring to FIG. 1, a mobile device 110 is exposed to objects 120, 122. The mobile device 110 can be a mobile telephone having an image capture device, such as a photo camera. The mobile device 110 can be docked, contained, cradled, or otherwise supported by a case 112. The case 112 can have an opening or optically transparent window to permit image capture by the mobile device 110 while positioned in the case 112. The objects 120, 122 are a celestial body 120, here the sun, and a building 122, although other objects, e.g., mountains, roads, landmarks, etc., may be present and used as discussed herein.

The mobile device 110 can be located in one or more coverage areas of one or more position location systems. For example, the mobile device 110 can be in a coverage area of a wireless communication system, such as a cellular telephone system. The mobile device 110 can be, for example, in the coverage area of one or more base stations 150 of the wireless communication system. Additionally, or alternatively, the mobile device 110 may be in the coverage area of one or more access points 140 of one or more wireless local area networks. Similarly, the mobile device 10 may be in the coverage area one or more satellites 130-1 and 130-2 of a Global Navigation Satellite System (GNSS).

The wireless communication system typically includes more than one base station 150, although only one base station 150 is illustrated for the sake of brevity and clarity. The wireless communication system may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available.

A WLAN may be, for example, an IEEE 802.11x based network, an IEEE 802.15x based network, or a Wireless Personal Area Network (WPAN). A WPAN may be, for example, a Bluetooth network, or some other type of network.

The GNSS can include one or more satellite positioning systems, such as the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal), which may be, for example, synchronized with GPS time. Each such transmitter may be assigned a unique PN code so as to permit identification by a remote receiver. Pseudolites are useful in situations where GNSS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and others.

The mobile device 110 may be able to determine its position or a position estimate based on signals from one or more of the wireless communication system, GNSS, or WLAN. For example, the mobile device 110 may be able to determine its position or a position estimate in conjunction with the base station 150 based on any one of Advanced Forward Link Trilateration (AFLT), cell site location, cell sector location, Time of Arrival, Time Difference of Arrival, and the like or some combination thereof. The mobile device 110 may also be able to determine its position or a position estimate based on Access Point 140 coverage area or a position location technique similar to those performed in relation the base station 150. Similarly, the mobile device 110 may be able to determine its position or a position estimate based on the location techniques supported in one or more GNSS.

The mobile device 110 may also be able to determine its position or a position estimate based on hybrid positioning techniques that use signals from some combination of the wireless communication system base station 150, WLAN access point 140, and GNSS satellites 130-1 and 130-2. The mobile device 110 may determine the position solution independently or may determine the position solution in combination with one or more network elements, such as a Position Determination Entity (PDE).

The mobile device 110 typically includes some type of clock or time reference, or can access a clock or otherwise derive a time of day. Often, the mobile device 110 utilizes the clock as part of the position location process. The mobile device 110 can capture an image of the celestial object 120 and use the position estimate along with the time of day in order to calibrate, correct, or otherwise modify the measurements made by orientation sensors within the mobile device 110.

The mobile device 110 can use internal orientation sensors to determine the azimuth angle 162 and elevation angle 164 of the mobile device 110 when the image of the celestial object 120 is captured. The azimuth angle 162 is illustrated in FIG. 1 as being measured in a clockwise manner, but the azimuth angle 162 may be measured clockwise or counterclockwise, and the direction and reference direction of the azimuth angle 162 is measured in a manner to permit comparison to an almanac or a look up table of positions of the celestial object 120.

Figure 2:
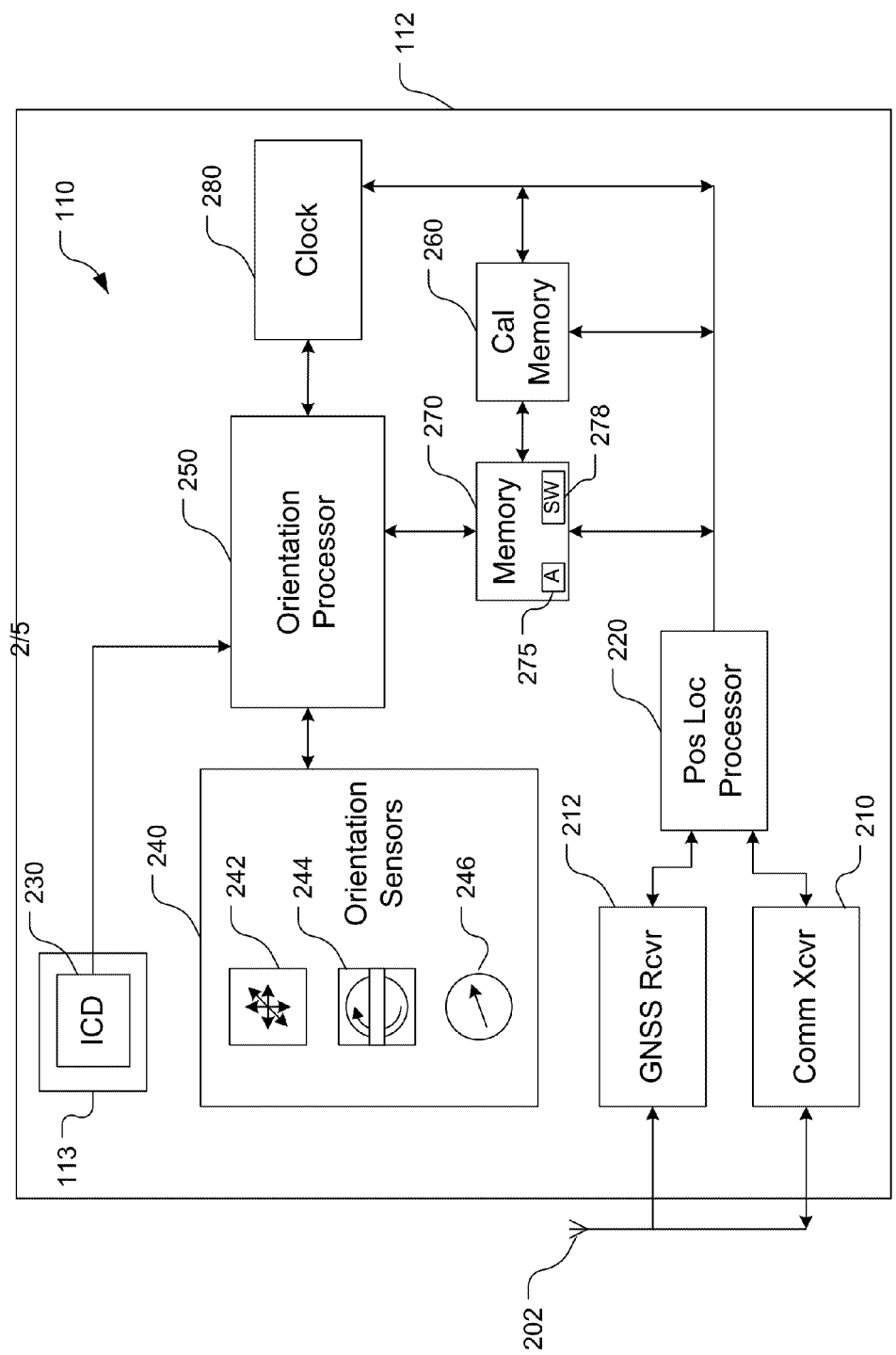
FIG. 2 is a simplified functional block diagram of a mobile device.

Referring to FIG. 2, the mobile device 110 includes an image capture device 230, which may be a photo camera. The image capture device 230 can be configured to capture signals in the visible light spectrum, non-visible light spectrum, or some combination thereof. The image capture device 230 can be, for example, a Charge Coupled Device (CCD), a CMOS camera, optical detectors, and the like, or some combination thereof.

The processors 220, 250 are preferably intelligent devices, e.g., central processing units (CPUs) such as those made by Intel® Corporation or AMD®, a microcontroller, an application specific integrated circuit (ASIC), etc. The processors 220, 250 may be different from each other or the same, may be physically separate, or may be parts of a single device. Memory 270 may include random access memory (RAM) and/or read-only memory (ROM). The memory 270 stores computer-readable, computer-executable (processor-readable, processor-executable) software code 278 containing instructions for controlling the processors 220, 250 to perform functions described below (although the description may read that the software 270 performs the function(s)). The software 278 can be loaded onto the console mobile device 110, e.g., by being downloaded via a network connection, uploaded from a disk, etc.

The case 112 of the mobile device 110 has an optically transparent window 113 positioned to permit operation of the image capture device (ICD) 230 while in the case 112. The window 113 may be, for example, a hole in the case 112 or a portion having optically transparent material. The window 113 need not be completely transparent across the entire spectrum sensed by the image capture device 230. However, the spectral response of the window 113 should be known or otherwise provided to the mobile device 110 or should not prevent the mobile device 110 from recognizing and locating a celestial object if performed automatically or semi-automatically. For example, a bag or cloth could contain the mobile device (e.g., being placed in a user's pocket), if the mobile device 110 can discern an object of interest, e.g., a celestial body, in a captured image.

The mobile device 110 can also include one or more orientation sensors 240. The orientation sensors 240 can include, for example, one or more accelerometers 242, a gyroscope 244, and a compass 246. The accelerometer(s) 242 can be configured, for example, to determine an orientation of the mobile device 110. The compass 246 can be configured to determine a heading or reference direction of the mobile device 110.

The mobile device 110 can be configured to capture an image of a celestial object using the image capture device 230. The image capture device 230 can communicate or otherwise couple the captured image to an orientation processor 250. Measurements from the orientation sensors 240 made concurrent with image capture can be coupled to the orientation processor 250. A clock 280 is coupled to the orientation processor 250 to provide a time of day for the image capture. The orientation processor 250 utilizes the orientation measurements, time of day, and captured image of the celestial body in combination with the position of the mobile device 110 to calibrate the orientation sensors 240.

The mobile device 110 includes one or more wireless devices to enable position location. In the mobile device 110 embodiment of FIG. 2, the mobile device 110 includes an antenna 202 coupled to a GNSS receiver 212 as well as a communication transceiver 210. The GNSS receiver 212 can contribute to position location, for example, by determining pseudoranges to one or more GNSS satellites and by receiving navigation messages that may be transmitted by the GNSS satellites.

The communication transceiver 210 can be, for example, a cellular telephone transceiver. The communication transceiver 210 can be configured, for example, to support any one of several position location techniques. For example, the communication transceiver 210 can be configured to determine a pseudorange or a time of arrival from signals transmitted by a cellular base station.

The signals from the position location receivers, whether the GNSS receiver 212, communication transceiver 210, or both, are coupled to a position location processor 220. The position location processor 220 can be configured to determine the position or a position estimate of the mobile device 110. The position location processor 220 can be configured, for example, to perform mobile-based position location or mobile-assisted position location. In mobile-assisted position location, the position location processor 220 determines the position or position estimate in conjunction with one or more remote devices, such as a Position Determination Entity that is part of a wireless communication network.

The position or position estimate of the mobile device 110 is coupled to or otherwise made available to the orientation processor 250. The orientation processor 250 can access an almanac 275 of the celestial body to determine the predicted location of the celestial body. The almanac 275 is stored, here for example, in memory 270.

The almanac 275 for the celestial body can be configured to store one or more tables that permit the location of the celestial body. For example, the almanac 275 stored in memory 270 can store the locations of the sun throughout the day for each of a plurality of reference locations on the earth. The reference locations on the earth can be, for example, different locations along the earth's equator. The orientation processor 250 can correct or offset the location of the celestial body set forth in the almanac 275 to compensate for the location of the mobile device determined by the position location processor 220. For example, the orientation processor 250 can locate the almanac reference location nearest the position of the mobile device 110 and retrieve the corresponding almanac 275 from the memory 270. The orientation processor 250 can compensate the almanac data to determine the location of the celestial body relative to the location of the mobile device 110. The process of compensating entries in an almanac for a location of a device, or the complement, is well understood in the context of celestial navigation.

The orientation processor 250 retrieves calibration information from a calibration memory 260 for the orientation sensors 240. Here, the calibration memory 260 is separate from the memory 270, but the memory 260 could be a portion of the memory 270. The orientation processor 250 corrects the sensor measurements, in particular the azimuth and elevation angle measurements, made at the time of the image capture of the celestial object. In other embodiments, the orientation processor 250 may operate on the uncorrected sensor measurement values.

The orientation processor 250 compares the location of the celestial body derived from the position location, time of day, and almanac to the location of the celestial body determined from the image capture and orientation sensor measurements to determine a residual error. The orientation processor 250 can update the calibration tables in the calibration memory 260 based on the residual error.

It has been determined, that calibration of orientation sensors in the mobile device 110 is not too demanding on the photo camera resolution and the mobile device 110 clock (time) and location accuracy.

The camera photo sensor of the image capture device 230 should be capable of measuring celestial images' angular locations with a resolution on the level of a fraction of a degree. This level of accuracy can be easily achieved with cameras having about 1 mega pixel or higher resolution. Cameras with this level of resolution are not uncommon in modern mobile devices.

Timing errors as large as 0.5-1 minute clock error can be tolerated where the celestial body is the sun or the moon. This is because the sun/moon calculated position error on the sky will be proportional to the very slow rate of change of the sun/moon azimuth and elevation, on average 360 degrees per 24 hours, or 0.25 degree/minute.

Likewise, a few kilometers location error will be sufficient for an accurate calculation of the celestial object position on the sky. This is because, on average, the visible sun/moon azimuth and elevation will change by 1 angular degree per 1 degree of user latitude/longitude change, that (in equatorial areas) will constitute approximately 1 angular degree per 110 kilometers.

Calibration of the orientation sensors 240 may be based on manual image capture of the celestial body or automated or semi-automated image capture of the celestial body. In one embodiment of a manual calibration mode, the user points the mobile device 110 approximately in the direction of the celestial object (Sun or Moon) such that the celestial object image can be detected and captured by the optical sensor in the image capture device 230. Then the user may initiate the calibration, for example, by pressing a button or by audible instructions in a mobile device having voice recognition capability.

In an embodiment of an automatic calibration mode, the photo sensor in the mobile device 110 can be constantly or periodically open (not completely obstructed by other objects) and active, searching for a clear image of a celestial body, such as the Sun or Moon. Whether in automatic or manual mode, images from the image capture device 230 can be used to determine or correct orientation parameters where an object is discernable from the image such that the object can be identified and its location in the image determined.

Once an image has been detected and captured in the manual or automatic calibration mode, the orientation processor 250 can process the image orientation, brightness, size, spectrum, and other parameters in order to verify and reliably identify the image as being from a celestial object. The orientation processor 250 can perform processing to discriminate the captured celestial object image from any reflected images and/or artificial light sources. If the spectrum range of the image captured by the image capture device 230 extends outside of the visible light spectrum, towards infrared or ultraviolet, the captured non-visible spectral parts of the sun/moon spectrum can be used for celestial body image identification.

Whether initiated manually, semi-automatically, or automatically, image detection and identification can be used as a trigger for a number of subsequent processing events. The mobile device 110 in combination with the photo sensor can measure the sun/moon image angular position relative to the photo sensor optical axes at the time of image capture.

The orientation processor 250 can determine the time of day from the clock 280, can retrieve the celestial object almanac information from the memory 270, and can receive the current location from the position location processor 220. The orientation processor 250 can calculate a celestial object "true" elevation and azimuth based on the current device location and time.

The orientation processor 250 can read and process the orientation sensor 240 data, for example, from the accelerometer 242 and/or compass 246, and determine mobile device orientation relative to the horizon and/or device azimuth. The orientation processor 250 can use photo sensor measurement, orientation sensor measurements, and calculated Sun/Moon azimuth and elevation to calibrate the orientation sensors 240.

Calibration can be performed in a variety of ways. In a first embodiment, the device orientation (azimuth and/or tilt) computed from the orientation sensor data and the photo sensor angular measurements can be used to determine a "measured" Sun/Moon azimuth and/or elevation. The "measured" Sun/Moon azimuth or/and elevation will be subtracted from the "calculated" Sun/Moon azimuth and elevation that is based on the time, location, and almanac information. The orientation processor 250 can determine the difference between measured and calculated parameters, and can save the differences as correction or calibration factors to the orientation sensor measurements. The orientation processor 250 can, for example, save the correction or calibration factors in the calibration table 260.

In a second embodiment, the orientation processor 250 can use the photo sensor angular measurements together with the "calculated" Sun/Moon azimuth and elevation, derived from the time and device location, to calculate a device orientation (e.g. azimuth and/or tilt). The orientation processor 250 can compare the calculated device orientation against the device orientation (e.g. azimuth and/or tilt) measured by the device orientation sensors 240. The orientation processor 250 can store the difference between the two parameters in calibration table 260 as correction factors to the orientation sensor measurements.

The orientation processor 250 can be configured to recalibrate the sensor readings and update the calibration table 260 following each image capture of a celestial object or following a plurality of image captures. The orientation processor 250 can recalibrate the calibration values based on a single image capture of a celestial object or a plurality of image captures of a celestial object. Moreover, the plurality of images need not be of the same celestial object, although typically such will be the case.

While any single calibration could be utilized to update the calibration table 260, multiple repetitions of the above recalibration process, starting from the sun/moon image detection and taking new measurements may be performed when possible. Multiple measurements of the same parameters (image location, orientation sensor readings) can be filtered to improve calibration accuracy and reliability, for example, to remove measurement outliers.

A more accurate calibration may be obtained by capturing the image of the celestial object and taking orientation measurements at different device orientations. Many parameters do not have just constant error, and the correction provided in the calibration table 260 may depend on the orientation. For example, a compass 246 azimuth error may depend on the direction and the device measurements should be calibrated at multiple directions to account for the error based on direction.

Sensor parameters typically drift over time, for example, due to temperature change. Thus, calibration table 260 entries may be valid for certain constraints. A time constraint may be used to make calibration results older than a threshold time obsolete.

Multiple measurements may also be advantageous for the calibration of an angular rate gyro 244 if such a sensor is present in the mobile device 110. The calibration of the angular rate gyro 244 may differ from the calibration of a sensor that is used for static measurements. For example, the mobile device 110 may capture multiple images of a celestial object. If the orientation processor 250 determines from several consecutive astronomical measurements that the mobile device 110 is not rotating (e.g., if the sun image does not move on the photo sensor), the orientation processor 250 can determine that the gyro 244 output constitutes a gyro offset and this offset value can be saved in the calibration table 260 as an offset correction.

Alternatively, if the orientation processor 250 determines from several consecutive astronomical measurements that the mobile device 110 turned or otherwise rotated over a certain time interval, the orientation processor 110 can calculate a turn angle, and the turn angle and the time interval can be used to calibrate a gyro scale factor.

Figure 3:
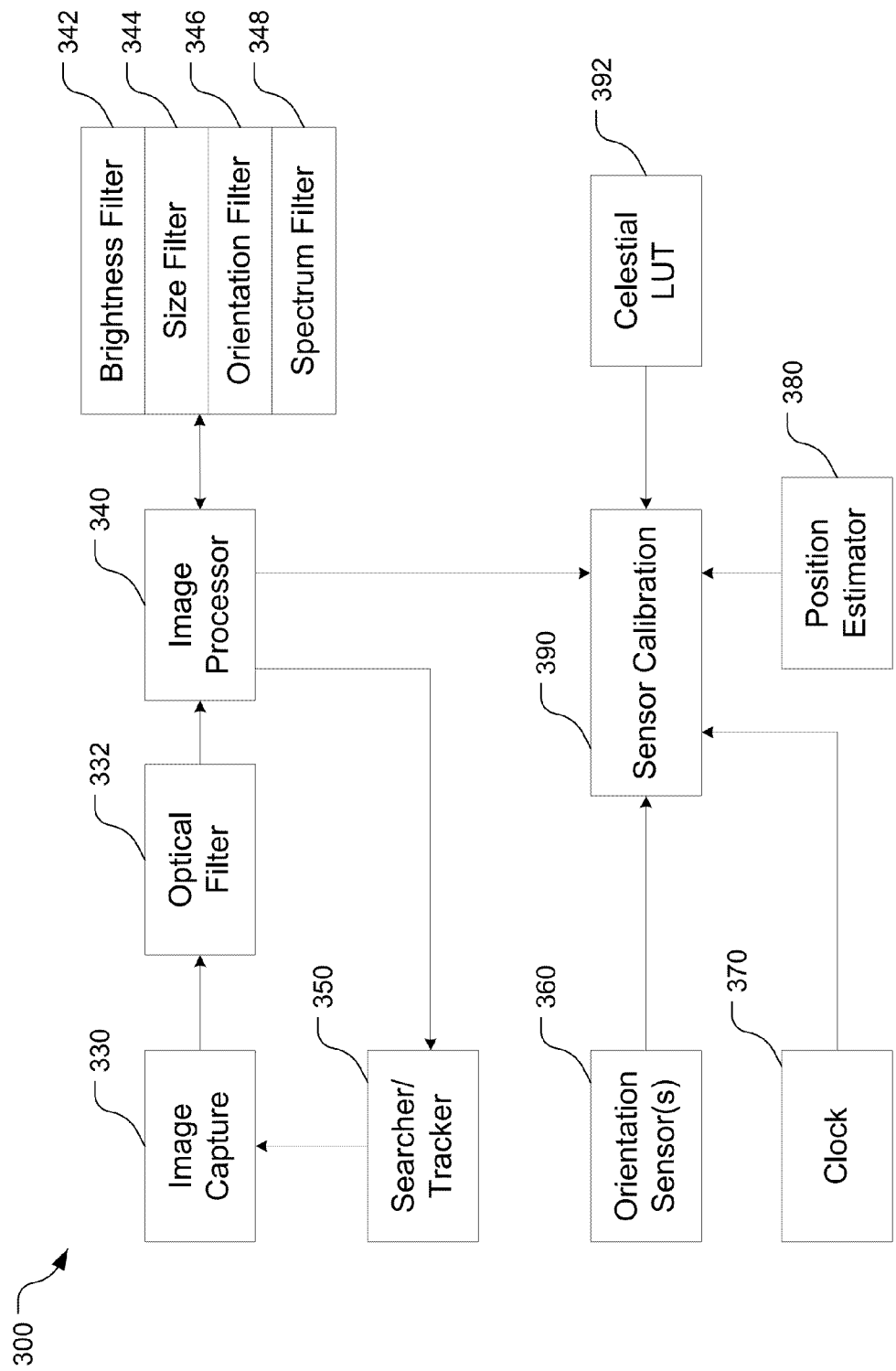
FIG. 3 is a simplified functional block diagram of a sensor calibrator based on celestial objects.

Referring to FIG. 3, a mobile device 300 is configured for automated or semi-automated image capture and identification for sensor calibration. The mobile device 300 may also be configured for manual image capture of celestial objects. Additionally, although the elements of FIG. 3 include different reference designators, some of the elements may be the same as similar-named elements illustrated in the embodiment of FIG. 2.

The mobile device 300 includes an image capture device 330 configured to capture an image of a celestial object. The image capture device 330 can be, for example, controlled to be constantly searching for an image of a celestial object. Alternatively, the image capture device 330 can be configured to selectively capture images, which are then processed for the possibility of including an image of a celestial object.

The image capture device 330 provides the image to an optical filter 332. The optical filter 332 is optional, but when included, may be configured to selectively filter the spectrum of the captured image. In one embodiment, the optical filter 332 filters the captured image to remove portions of the spectrum in order to facilitate discrimination of a portion of the captured image as being of a celestial object. For example, the optical filter 332 may be configured to remove portions of a visible light spectrum or portions of a non-visible light spectrum.

The optical filter 332 need not operate on the actual optical signal at the image capture device 330, but may instead operate at the electrical output from the image capture device, which corresponds to the spectrum of the captured image.

The output from the optical filter 332 is coupled to an image processor 340. The image processor 340 can be coupled to one or more filters to enable discrimination and identification of celestial objects within a captured image. The filters may include, as here, a brightness filter 342, a size filter 344, an orientation filter 346, a spectrum filter 348, and the like, or some other means for filtering the captured image. Each of the filters 342, 344, 346, and 348 can be alternatively interpreted to be a constraint or a decision criterion.

The image processor 340 can use one or more of the filters 342, 344, 346, and 348 to process the captured image and determine whether the image includes an image of a particular celestial object, such as the sun, the moon, or a particular star. In the example described below, the image processor 340 uses the filters 342, 344, 346, 348 to determine whether a captured image includes an image of the sun.

The image processor 340 can use the brightness filter 342 to eliminate images that do not have sufficient brightness to be considered as having captured an image of the sun. The image processor 340 can use the size filter 344 to determine if the captured image includes an image of sufficient size to represent the celestial object, which in this example is the sun.

The image processor 340 can use the orientation filter 346 to determine if the measured orientation of the mobile device or the image capture is within some predetermined window about the calculated celestial object orientation. That is, the orientation filter 346 can eliminate those captured images for which the orientation of the mobile device 300 is too different from an expected orientation when capturing an image of the sun or other celestial object.

The image processor 340 can use the spectrum filter 348 to determine if the captured image includes a spectral response that is similar to an expected spectral response from the celestial object. In one embodiment, the spectrum filter 348 includes a mask of the expected spectral response, and the spectrum of the captured image is compared against the mask to determine if the captured image includes the image of the celestial object.

The image processor 340 can use the filters 342, 344, 346, 348 to determine the presence of the celestial object in the captured image regardless of whether automated, semi-automated, or manual image capture is utilized.

The image processor 340 can determine whether the captured image includes an image of the celestial object, and can control a searcher/tracker 350. The searcher/tracker 350 can be configured to align or otherwise control the orientation of the image capture device 330 in order to maintain tracking of the celestial object, e.g., when automated image capture is implemented. The processor 340 can use information about known objects and the present estimated orientation of the device 110 to determine whether the image contains an object and if so, which object. The memory 270 can store information regarding the appearances and locations of objects, and the information presently stored in the memory 270 may depend on the device's present location and/or orientation.

The image processor 340 communicates information related to the validated captured image to a sensor calibration module 390. For example, the image processor 340 can forward an entire captured image. The sensor calibration module 390 can access one or more orientation sensors 360 and can determine a measured orientation based on the sensor measurements. The module 390 can use the measured orientation to determine calibration parameters, e.g., by comparing the measured orientation with a calculated orientation.

The sensor calibration module 390 is also coupled to a celestial look up table 392 that includes an almanac for the celestial object, such as the sun. Further, the image processor 340 is coupled to a position estimator 380 that provides a position estimate of the mobile terminal 300. The position estimate can be used by the module 390 to calculate an expected orientation of the terminal 300 and to determine what almanac information to access and use.

Compass without Magnetometer Information

The mobile device 300 can use a single astronomical measurement in conjunction with an accelerometer (for the tilt compensation) as one of the orientation sensors 360 to provide information about device azimuth at the time of measurement (instant compass).

If the image capture module 330, e.g., camera, is no longer pointing to the celestial object, or the camera objective is obstructed, and magnetometer information is unavailable (e.g., a magnetometer is nonexistent, broken, inoperable, etc.), then a gyroscope (angular rate sensor) can be used. The gyroscope can be, for example, like those placed in devices for the image stabilization. Since the gyro provides turn angle (delta direction) rather than absolute direction, the sensor calibration module 390 determines the absolute direction using an initialization value and the direction delta provided by the gyroscope relative to the initialization value.

Direction initialization of a mobile device is performed using astronomical measurements. For this, a mobile device, similar to the mobile device 300, can capture images and is location/time aware, containing the gyroscope 244 and the accelerometer 242, but not necessarily containing a magnetometer. The compass emulation is accomplished by the sensor calibration module 390 determining and storing at an initial device azimuth from astronomical and accelerometer measurements and known device location and time. Using the initial values, the module 390 can compute current azimuth using the stored initial azimuth plus delta azimuth information from the gyroscope relative to the initialization moment. After the device's initial azimuth value, $Az_0$, has been measured at an initialization time, $T_0$, the device azimuth at any future time T is given by $Az_0$ plus the azimuth (turn angle) change determined from the gyro from time $T_0$ till time T.

Compass without Magnetometer or Gyro

A mobile device may be configured similarly to the mobile device 300, being able to capture images and being location/time aware, containing the image capture device 230, the accelerometer 242, but not the compass 246 or the gyroscope 244. This mobile device will use a photo-sensor-based virtual/emulated gyro where the turn rate will be determined by a processor processing the photo sensor images of stationary objects as the images of stationary objects will traverse the camera view field with speeds proportional to the camera turn rate. Similar to the discussion above, the combination of the astronomical measurements with the accelerometer and the emulated gyro are used to emulate the compass. The photo sensor will be used to emulate the gyro (by continuously tracking stationary objects) and to perform occasional astronomical measurements to initialize the compass to the absolute azimuth. Celestial object images could be processed the same way as land-based stationary objects images. In other words, tracking the sun or moon image will be sufficient for both the gyro (angular rate sensor) emulation and the compass emulation. On the other hand, as long as the sun/moon image is continuously tracked by the photo sensor, the gyro emulation will be unnecessary for compassing because instantaneous azimuth can be computed at any time from the astronomical observation directly, without knowledge of the device angular rate. The emulated gyro has almost no offset (drift) or scale factor error. A small amount of error is introduced by motion of the celestial object in the sky, which can be compensated.

Objects can be tracked for gyro emulation based on the camera's viewing angle and resolution. If the camera aperture is N degrees, and the photo sensor matrix of the camera is P pixels (columns) wide, an (automatically) tracked object image shift of one pixel will correspond to camera rotation by N/P degrees. The same will be true for vertical movement. This applies for celestial objects and remote stationary objects (e.g., far away buildings, landscape). More complex processing can be used to process image motion relative to the photo sensor caused by motion of the object (e.g., capturing images of a moving vehicle, or by linear motion of the camera with respect to near objects (e.g., capturing images from a moving vehicle).

Storage Bag and/or Vehicle Cradle

Referring again to FIG. 1, a container, e.g., a cradle or bag, 114 is provided for containing the mobile device 110. The container 114 is configured to hold the device 110 and provide for convenient carrying of the device 110. For example, the container 114 may be a bag configured to be connected to a vehicle such as a car or a bicycle, or to be carried by a user such as being configured to be worn over a user's shoulder or attached to a user's belt.

In the manual calibration mode, the user of the device 110 will periodically point the mobile device camera to the sun/moon and make sure the camera objective is not obstructed so that the photo sensor could acquire the image. The automatic mode, however, would be much more convenient, with the astronomical measurements happening automatically, any time the device camera objective is pointing toward the sun/moon. The automatic calibration will be especially important for devices in/on vehicles and where photo measurements will happen automatically and continuously.

To aid automatic astronomical measurements, the container 114 is made of a transparent material. The material is transparent for any portion of the spectrum used by the device 110, e.g., visual, infrared, and/or ultraviolet portion of the spectrum. Alternatively, the material may be less than transparent, e.g., partially opaque or obscuring, while allowing images of objects to be discerned and used in performing calculations to determine orientation and/or movement as described herein. For example, the container 114 may be made of cloth through which outlines of objects such as buildings, landmarks, or celestial objects may be discerned.

Sensor Calibration

Figure 4:
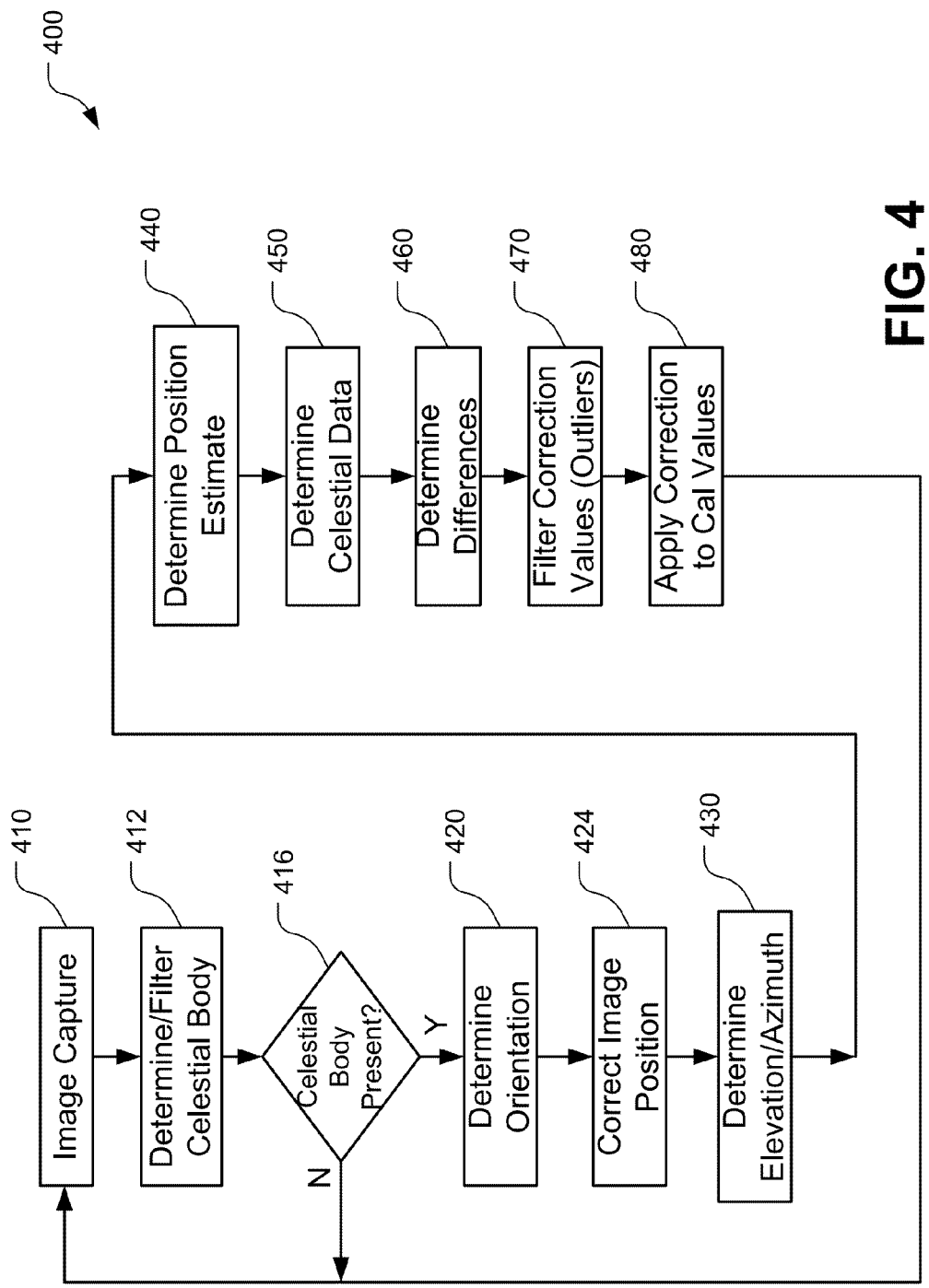
FIG. 4 is a simplified flowchart of a method of calibrating sensors in a mobile device.

Referring to FIG. 4, with further reference to FIGS. 1-3, a process 400 of calibrating sensors in a mobile device includes the stages shown. The process 400 is, however, is an example only and not limiting. The process 400 can be altered, e.g., by having stages added, removed, or rearranged.

At stage 410, an image is captured by the mobile device 110. The image capture device 230 is actuated, e.g., either automatically or manually by a user, to capture an image of the celestial body 120.

At stage 412, the image is analyzed to determine whether the celestial body 120 is present in the image. The image is filtered using the optical filter 332 if present. The image is further analyzed by the image processor 340 to determine whether the celestial body 120 is present in the image. The image processor 340 further uses the brightness filter 342, the size filter 344, the orientation filter 346, and/or the spectrum filter 348 to filter characteristics of the image to help the image processor 340 determine whether the celestial body 120 is present in the image.

At stage 416, an inquiry is made as to whether the celestial body 120, or other celestial body, is present in the image. The image processor 340 analyzes the filtered image to discern whether the image included an image of the celestial body 120 or other celestial body. If no celestial body is detected within the image, then the process 400 returns to stage 410. Otherwise, the process 400 proceeds to stage 420.

At stage 420, the orientation of the mobile device, and in particular the image capture device 230, is determined. The orientation processor 250 communicates with the orientation sensors 242, 244, 246 to determine the orientation of the mobile device 110 relative to a reference coordinate system, e.g., with the x-axis and y-axis being parallel to the earth's surface and the z-axis being perpendicular to the earth's surface.

At stage 424, the image position of the celestial object 120 is corrected. Using the information from the orientation sensors 242, 244, 246, the orientation can be accurately determined with respect to these axes.

At stage 430, the elevation and azimuth of the celestial object 120 relative to the mobile device 110 is determined. The image processor 340 analyzes the image to determine the elevation angle of the celestial object 120 relative to the mobile device 110. Further, the image processor 340 in combination with the orientation processor 250, analyzes the image to determine the azimuth angle 162 relative to the mobile device 110.

At stage 440, an estimate of the position of the mobile device 110 is determined. The position location processor 220 communicates with the GNSS receiver 212 and the communication transceiver 210 as appropriate and determines a position estimate of the mobile device 110.

At stage 450, celestial location data for the celestial body 120 is determined from the image and from almanac information. The sensor calibration module 390 uses a position estimate from the position estimator 380 to determine what almanac information to access and use to determine the celestial almanac data. The sensor calibration module 390 further uses input from the orientation sensor 360 and the clock 370 to determine the almanac data of the celestial object 120, such as the elevation angle 164 and the azimuth angle 162 based on the almanac data.

At stage 460, the differences between the determined azimuth angle 162 and elevation angle 164 from stage 430 and the celestial data determined at stage 450 are compared. Differences between the azimuth and elevation angles 162, 164 is determined using the position estimate of the mobile device 110 and the processing of the image captured by the image capture device 230 are compared with the celestial data determined from the almanac information. Differences between the angles determined in these two methods are determined by the sensor calibration module 390. Correction values for correcting the orientation sensors 242, 244, 246 are determined in order to correct the measured/determined angles 162, 164 from stage 430 to achieve the angles 162, 164 as provided and determined in stage 450. The almanac data is considered the true data and the determined data are corrected in order to achieve the true almanac data.

At stage 470, the correction values for the orientation sensors 242, 244, 246 are filtered. Measurement outliers are filtered or removed in order to improve calibration accuracy and reliability.

At stage 480, the filtered correction values are applied to the orientation sensors 242, 244, 246. These correction factors adjust the orientation determination by the mobile device 110 such that given the mobile device's position, the orientation sensors provide measure data such that the celestial object 120 will appear in an image captured by the mobile device where the almanac data for the celestial object 120 indicates that the celestial object 120 should be relative to the mobile device 110.

Compass Emulation

Figure 5:
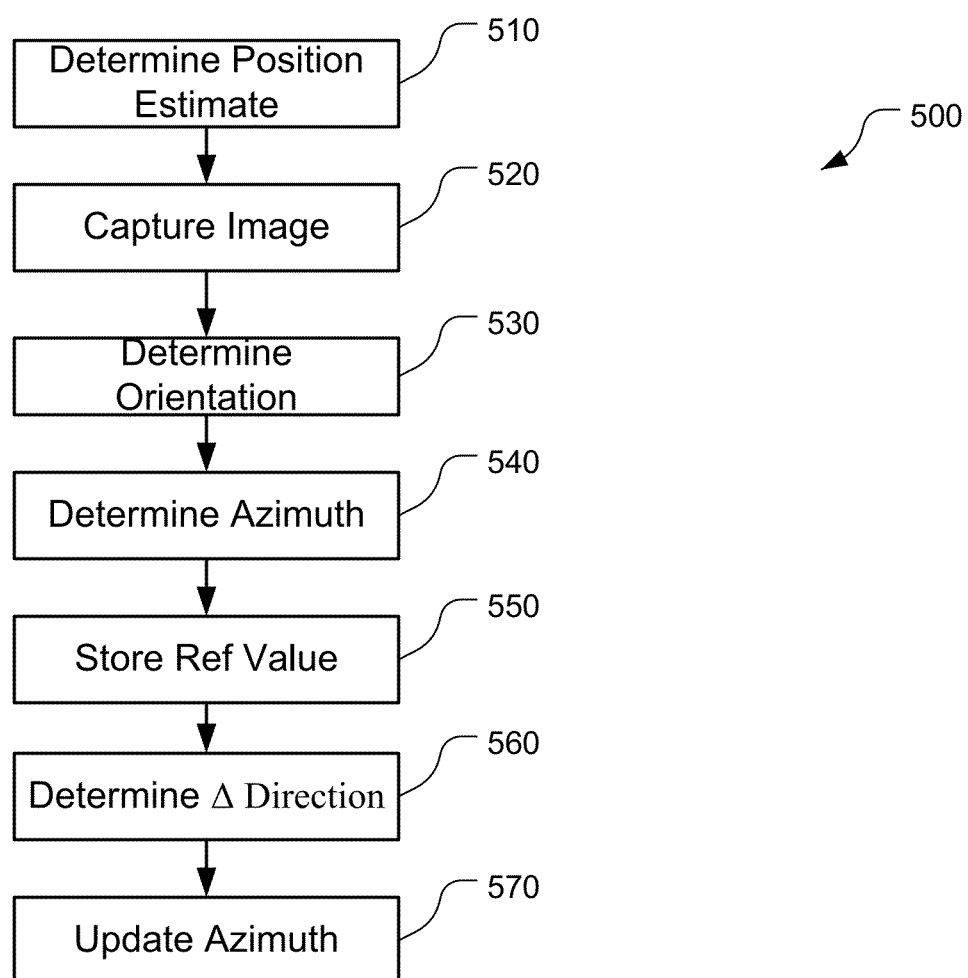
FIG. 5 is a simplified flowchart of a method of providing compass emulation in a mobile device.

Referring to FIG. 5, with further reference to FIGS. 1-3, a process 500 of providing compass emulation in a mobile device includes the stages shown. The process 500 is, however, an example only and not limiting. The process 500 can be altered, e.g., by having stages added, removed, or rearranged.

At stage 510, an estimate of the position of the mobile device 110 is determined. The estimate may be a center of a cell-sector or cell in which the mobile device 110 currently occupies. This may be determined by identifying a base station 150 with which the mobile device 110 is communicating.

At stage 520, an image is captured by the mobile device 110. The image capture device 230 is actuated, e.g., either automatically or manually by a user, to capture an image of the celestial body 120.

At stage 530, the orientation of the mobile device, and in particular the image capture device 230, is determined. The orientation processor 250 communicates with the orientation sensors 242, 244, 246 to determine the orientation of the mobile device 110 relative to a reference coordinate system, e.g., with the x-axis and y-axis being parallel to the earth's surface and the z-axis being perpendicular to the earth's surface.

At stages 540, 550, the azimuth angle of the celestial object 120 relative to the mobile device 110 is determined and stored. At stage 540, the image processor 340 in combination with the orientation processor 250, analyzes the image to determine the azimuth angle 162 relative to the mobile device 110. At stage 550, the determined azimuth angle 162 is stored in the memory 270 as a reference value.

At stages 560, 570, the change in azimuth angle is determined and used to update the present azimuth angle of the mobile device 110. At stage 560, the orientation processor 250 analyzes images from the image capture device 230 to determine direction and amount, and possibly rate, of motion of the mobile device 110 by analyzing the images for stationary objects and changes of where in the images the stationary objects appear (and timing of the images for rate calculations). At stage 570, the orientation processor 250 updates the present azimuth information in the memory 270 using the determined direction and amount of azimuth change since the last stored azimuth value.

The functions described in the embodiments may be implemented in hardware, software executed by one or more processors, firmware, or any combination thereof. If implemented in software, the functions are stored as one or more instructions or code or otherwise encoded on a tangible, non-transitory processor-readable medium. Processor-readable media includes physical computer storage media.

A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What is claimed is:

1. A mobile device configured to be used in a wireless communication network, the mobile device comprising:
    an image capture device;
    at least one sensor configured to measure a first orientation of the mobile device; and
    a processor communicatively coupled to the image capture device and the at least one sensor and configured to:
        identify an object in an image captured by the image capture device;
        estimate a first location of the object identified in the image relative to the mobile device based on the captured image and the first orientation;
        determine an estimated position of the mobile device based on signals received from one or more wireless communication networks;
        use the estimated position of the mobile device to access almanac data to determine a second location of the object relative to the mobile device; and
        use the second location of the object relative to the mobile device and the first location of the object relative to the mobile device to determine a calibration correction for the at least one sensor.

2. The mobile device of claim 1 wherein the object is a celestial object and the processor is configured to use the estimated position of the mobile device and a current time to determine the second location of the object relative to the mobile device.

3. The mobile device of claim 1 wherein to determine the calibration correction, the processor is configured to determine at least one of (1) the first location of the object relative to the mobile device using the image and the first orientation of the mobile device, or (2) a second orientation of the mobile device using the image and the second location of the object relative to the mobile device.

4. The mobile device of claim 3 wherein to determine the calibration correction, the processor is configured to:
    compare the second location and the first location to determine a location difference; and
    determine the calibration correction such that the location difference will be reduced.

5. The mobile device of claim 3 wherein to determine the calibration correction, the processor is configured to:
    determine the second orientation of the mobile device; and
    determine the calibration correction such that a difference between the first orientation and the second orientation will be reduced.

6. The mobile device of claim 1 wherein the processor is configured to determine the first orientation and determine the calibration correction based, at least in part, on a plurality of images captured by the image capture device.

7. The mobile device of claim 1 wherein the processor is configured to determine the first orientation for each of a plurality of images captured by the image capture device and to determine a turn rate of the mobile device based on the first orientation for the plurality of images to provide a virtual gyroscope for the mobile device.

8. The mobile device of claim 1 wherein the image capture device is configured to capture images automatically, without user input.

9. The mobile device of claim 1 wherein the processor is configured to provide a virtual compass for the mobile device using the first orientation, the calibration correction, the image, and the second location of the object.

10. A method in a mobile device of calibrating the mobile device, the method comprising:
    capturing, with an image capture device of the mobile device, an image of an object;
    determining a first orientation of the mobile device using a sensor of the mobile device;
    estimating a first location of the object in the image relative to the mobile device based, in part, on the captured image and the first orientation of the mobile device;
    determining an estimated position of the mobile device based on signals received from one or more wireless communication networks;
    determining a second location of the object relative to the mobile device using the estimated position of the mobile device and almanac data, wherein the almanac data is obtained using a current time; and
    determining a calibration correction for the sensor, the calibration correction being determined using the second location of the object relative to the mobile device, the first location of the object relative to the mobile device and the first orientation.

11. The method of claim 10 wherein the object is a celestial object and determining the second location of the object relative to the mobile device comprises using the estimated position of the mobile device and the current time.

12. The method of claim 10 wherein determining the calibration correction comprises determining at least one of (1) the first location of the object relative to the mobile device using the image and the first orientation of the mobile device, or (2) a second orientation of the mobile device using the image and the second location of the object relative to the mobile device.

13. The method of claim 10 further comprising repeating the capturing, determining the first orientation, and determining the calibration correction.

14. The method of claim 13 wherein repeating the capturing is done for at least one of (1) for different objects, or (2) at different device orientations.

15. The method of claim 10 wherein the capturing occurs automatically, without user input.

16. A computer program product residing on a non-transitory processor-readable medium, of a mobile telecommunications device, and comprising processor-readable instructions configured to cause a processor to:
    determine a first orientation of the mobile device using a sensor of the mobile device;
    estimate a first location of an object based on a captured image of the object and on the first orientation determined by the sensor;
    determine an estimated position of the mobile device based on signals received from one or more wireless communication networks;
    determine a second location of the object relative to the mobile device using the estimated position of the mobile device and almanac data, wherein a current time is used to access almanac data; and use the second location of the object relative to the mobile device and the first location of the object relative to the mobile device to determine a calibration correction for the sensor.

17. The computer program product of claim 16 wherein the instructions configured to cause the processor to determine the calibration correction are configured to cause the processor to determine at least one of (1) the first location of the object relative to the mobile device using the image and the first orientation of the mobile device, or (2) a second orientation of the mobile device using the image and the second location of the object relative to the mobile device.

18. The computer program product of claim 17 wherein the instructions configured to cause the processor to determine the calibration correction are configured to cause the processor to:
compare the second location and the first location to determine a location difference; and
determine the calibration correction such that the location difference will be reduced.

19. The computer program product of claim 17 wherein the instructions configured to cause the processor to determine the calibration correction are configured to cause the processor to:
determine the second orientation of the mobile device; and
determine the calibration correction such that a difference between the first orientation and the second orientation will be reduced.

20. The computer program product of claim 17 wherein the instructions configured to cause the processor to determine the calibration correction are configured to cause the processor to determine the calibration correction based, at least in part, on a plurality of images captured by the image capture device.

21. The computer program product of claim 17 wherein the instructions configured to cause the processor to determine the first orientation are configured to cause the processor to determine the first orientation for each of a plurality of images captured by the image capture device, the instructions further comprising instructions configured to cause the processor to determine a turn rate of the mobile device based on the first orientation for the plurality of images to provide a virtual gyroscope for the mobile device.

22. A mobile device configured to be used in a wireless communication network, the mobile device comprising:
image capturing means for capturing an image;
first orientation means for measuring a first orientation of the mobile device; and
correction means, communicatively coupled to the image capturing means and the first orientation means, for:
identifying an object in an image captured by the image capturing means;
determining a first location of the object identified in the image relative to the mobile device based on the captured image and on the first orientation;
determining an estimated position of the mobile device based on signals received from one or more wireless communication networks;
using the estimated position of the mobile device and a current time to access almanac data to determine a second location of the object relative to the mobile device; and
using the second location of the object relative to the mobile device and the determined first location of the object relative to the mobile device to determine a calibration correction for the first orientation means.

23. The mobile device of claim 22 wherein the correction means are configured to:
compare the first location and the second location to determine a location difference; and
determine the calibration correction such that the location difference will be reduced.

24. The mobile device of claim 22 wherein the correction means are configured to:
determine a second orientation of the mobile device; and
determine the calibration correction such that a difference between the first orientation and the second orientation will be reduced.

25. The mobile device of claim 22 wherein the correction means are configured to determine the first orientation and determine the calibration correction based, at least in part, on a plurality of images captured by the image capturing means.

26. The mobile device of claim 22 wherein the correction means are configured to determine the first orientation for each of a plurality of images captured by the image capturing means and to determine a turn rate of the mobile device based on the first orientation for the plurality of images to provide a virtual gyroscope for the mobile device.

27. The mobile device of claim 22 wherein the image capturing means is configured to capture images automatically, without user input.

28. The mobile device of claim 22 wherein the correction means are configured to provide a virtual compass for the mobile device using the first orientation, the calibration correction, the image, and the actual location of the celestial body.

29. The mobile device of claim 1, wherein the second location of the object relative to the mobile device corresponds to an actual location of the object relative to the mobile device.

30. The computer program product of claim 16, wherein the object is a celestial body.

31. The mobile device of claim 22, wherein the object is a celestial body.

32. The mobile device of claim 1, wherein the mobile device further comprises a memory coupled to the processor, the memory comprising a calibration table, and
wherein the calibration correction is used to update an entry in the calibration table.

33. The mobile device of claim 32, wherein the processor is further configured to delete calibration entries that are older than a time threshold.

\* \* \* \* \*